United States Patent [19]

Sweeney et al.

[11] Patent Number: 4,973,195

[45] Date of Patent: Nov. 27, 1990

[54] STORAGE FACILITY FOR HAZARDOUS WASTE AND THE LIKE

[75] Inventors: John M. Sweeney; William P. Lafayette, both of Allegheny County, Pa.; Brian Marstellar, Knox County, Tenn.

[73] Assignee: BBJ Company, Inc., Pittsburgh, Pa.

[21] Appl. No.: 428,207

[22] Filed: Oct. 27, 1989

[51] Int. Cl.⁵ .................................................. B09B 1/00
[52] U.S. Cl. ...................................... 405/128; 405/52
[58] Field of Search ................. 405/128, 129, 52, 303, 405/53; 220/18, 5 A; 52/194, 200, 246

[56] References Cited

U.S. PATENT DOCUMENTS

| 4,375,930 | 3/1983 | Valiga | 405/128 |
| 4,453,857 | 6/1984 | Serra et al. | 405/128 |
| 4,464,081 | 8/1984 | Hillier et al. | 405/128 |
| 4,624,604 | 11/1986 | Wagner et al. | 405/128 |
| 4,697,954 | 10/1987 | Grund | 405/128 |
| 4,728,222 | 1/1988 | Wiemer | 405/128 |
| 4,846,604 | 7/1989 | Holtmann | 405/128 |

Primary Examiner—Dennis L. Taylor
Attorney, Agent, or Firm—Buchanan Ingersoll

[57] ABSTRACT

A method and facility for the storage and containment of material is provided, in which the facility is mounted spaced above the surface of the earth. Drainage means are mounted within the spaced distance created between the facility and the earth surface. This space between the facility and the earth surface is adapted for visual inspection of the lower surface of the base and the drainage means.

28 Claims, 4 Drawing Sheets

STORAGE FACILITY FOR HAZARDOUS WASTE AND THE LIKE

BACKGROUND OF THE INVENTION

1. Field of the Invention

The present invention relates to a leak resistant facility for storing hazardous material. More specifically, the invention relates to a storage containment structure for hazardous or other waste which is located on piles or the like, some distance above the surface of the earth to expose the lower surface of the base and the drainage system.

2. Description of the Prior Art

A number of storage facilities for hazardous wastes have been utilized in the past few decades, especially since the dangers associated with the storage of waste have become more well known. A large percentage of waste is stored underground, in containers ranging from metal and plastic barrels to specially constructed cubicles and abandoned mines. It has become increasingly recognized that at grade storage of waste allows for more careful monitoring of the facility after the waste has been loaded to prevent damage to the environment in the case of leakage.

The prior art relating to this invention is best characterized by Hillier, et al., U.S. Pat. No. 4,464,081, issued Aug. 7, 1984. The device disclosed in the Hillier patent is an above-ground facility which rests on the earth surface. The building comprises a base, walls and a cap. The inner portion of the building has successive layers of an impervious membrane, separated by a pervious layer which allows the passage of liquids therethrough. Water or other liquids which may enter the hazardous waste from the outside, or liquids leaching out of the waste itself are retained by the impervious membranes. If a break should occur, liquid passing through a membrane would enter the pervious layer, and be transported via gravity to the lowest point in the system. A drainage system, provided at the lowest point of each layer, allows the liquid to be drained off and tested. In this way, monitoring of the leachate is utilized to detect leaks and contamination of the system.

This system, while very effective in detecting and retaining leaks in the membrane system, is limited in its ability to detect leaks or blockages in the membrane system at the base of the facility, in the base itself or those portions of the drainage system which reside inside the facility. Additionally, at grade storage in low lying or tidal areas presents a serious environmental risk in the event of a flood or an exceptionally high tide condition. Water which envelops the containment structure is much more likely to leak into the structure and create an uncontrollable effluent of hazardous liquid.

There remains, therefore, a need in the art for a facility which allows for the leak resistant storage of hazardous and other waste and the detection of leaks in the retention system, and which also allows visual examination and physical inspection of the entire facility and the entire drainage system. Additionally, such a facility should be adapted to resist flood waters and high water table conditions in low lying areas.

SUMMARY OF THE INVENTION

A facility for the storage and containment of material is provided which is preferably mounted on piles above the surface of the earth. This creates a space between the facility and the earth surface sufficient for visual inspection of the lower surface of the base and the drainage means. The mounting of the facility on such piles also increases its adaptability to a wide range of topographic conditions at the waste site.

The facility comprises a base, preferably constructed of concrete, having an upper surface, a lower surface and a plurality of holes extending at least partially therebetween. The base may further comprise depressions located at the inner ends of the holes. Interior drainage means may be mounted within the holes extending through the base to carry liquids to an ultimate drain point. The interior drainage means, which has an inner end and an outer end, may comprise a siphon at the inner end, mounted within the base depressions, adapted to drain out a liquid which collects in the depressions.

These interior drainage means preferably extend into the holes in the base from a point completely interior to the sealing means, and from a point within the pervious layer of the sealing means. A sump and/or pumping mechanism may be provided to move liquid matter from one of the chamber and sealing means to the drainage means.

The upper surface of the base forms the lower surface of the chamber and is canted to facilitate runoff of liquids from the base to at least one low point. The canted upper base surface may comprise a raised point and be canted away from the raised point, or may comprise a raised center line and be canted away from the raised line. Furthermore, a sump and/or other pumping mechanism may be provided at a low point of the base to facilitate the removal of collected liquid.

Base support means are provided to support the facility a preselected spaced distance from the earth surface. Preferably, a plurality of members are provided which are equally spaced from each other or at least each support an equal load. Alternately, the members may be provided which are not equally spaced, but which support a share of the facility proportionate to the spacing therebetween. The members are preferably equally sized, but if unequal members are utilized, each should support a share of the facility proportionate to the size thereof. Drainage means are mounted adjacent to the lower surface of the base, within the spaced distance created between the facility and the earth surface, and are adapted to engage at least one of the holes in the base.

Side support means, preferably constructed of concrete, are mounted on the upper surface of the base and a roof means is mounted on the side support means to form a chamber in conjunction with the side support means and the base. Sealing means are mounted within the chamber to partition the chamber from the exterior environment having at least one membrane layer and at least one pervious layer adapted to be applied adjacent to at least a portion of the membrane layer. A resealable door may also be provided in the side support means.

The roof means is preferably constructed of concrete and comprises an inner surface which is dome shaped and forms the upper surface of the chamber. The dome shaped interior surface is adapted to facilitate the collection of condensed liquids within the chamber and to also facilitate runoff of exterior rain water. The roof means is further adapted to reduce leachate by providing a barrier to rain water. Additionally, its unitary construction prevents the entry of rain water subsequent to loading. The inner surface of the roof means preferably comprises an epoxy coating. The roof means preferably is provided with at least one fill hatch for the loading and unloading of material into the chamber and at least one vent.

A roof gutter is preferably mounted along the perimeter of the roof means, adapted to drain water from the roof means to a roof drain point. This gutter system may be adapted to provide either treatment or storm water discharge. The facility may also be provided with a base 10 which extends beyond the side support means and further comprises a base gutter therein for the transport of liquid runoff to a base drain point. This drain point, like the roof drain point, is preferably adapted to ultimately drain into the drainage means.

A method is also disclosed for the storing of hazardous material, utilizing a sealed, enclosed structure having an interior drainage system contained therein. The method comprises raising the structure a preselected distance above the surface of the earth to create a space thereunder, the space being sized and adapted to allow visual inspection of the underside of the enclosed structure. An exterior drainage system is then mounted in the space, adapted to engage the interior drainage system to allow maintenance and visual monitoring of the exterior drainage system.

These and other advantages and features of the present invention will be more fully understood on reference to the presently preferred embodiments thereof and to the appended drawings.

DESCRIPTION OF THE PREFERRED EMBODIMENTS

Figure 1:
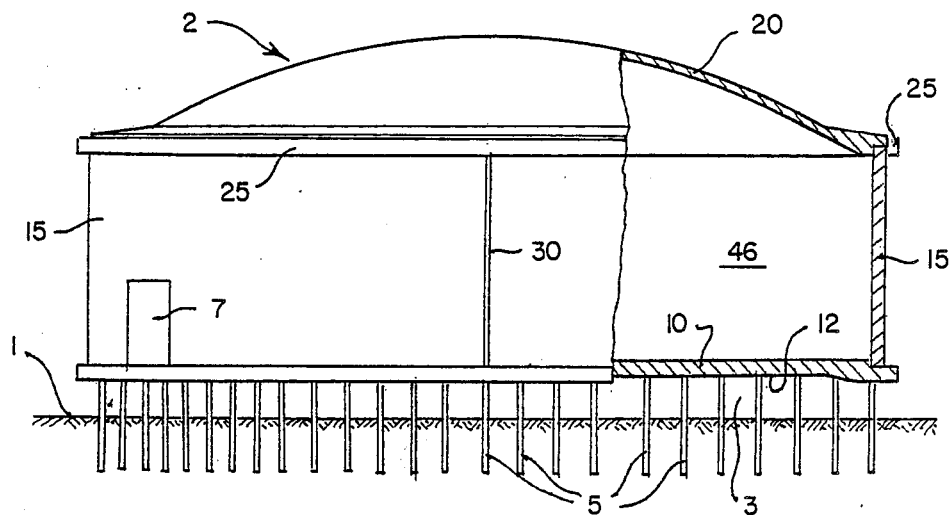
FIG. 1 is an elevational view, partially in section, of the facility.

Referring to FIG. 1, the facility 2 is shown partially in section. The facility 2 has a base 10 with side supporting walls 15 mounted thereon and extending upwardly. A roof 20 is mounted on the top portion of the side supporting walls 15, and is preferably dome shaped. An interior chamber 46 is formed thereby. A roof gutter 25 extends along the perimeter of roof 20, and empties into roof gutter drain 30 at a low point. A plurality of roof gutter drains may optionally be provided. The entire facility 2 is supported on piles 5 or the like above the earth 1. Other base support means may include piers, cassions, columns, posts and the like. A space 3 is therefore created between the underside 12 of the base 10 and the earth surface 1.

A removable door 7 in side support wall 15 may also be provided. The door 7 would be gasketed in any known manner (not shown) so as to be resealable. The door 7 would be utilized in the event that the waste being stored was contained in secondary storage devices, such as drums, or was comprised of physical objects capable of loading and movement. These other objects might then be loaded into the facility by means of a forklift through the door, rather than loaded through the top. A ramp (also not shown) may be utilized to facilitate access to the storage building from grade. The door 7 itself would merely be cut from the wall and be removed by sliding it outwardly from the wall. The inner membranes of the facility would also be mounted on the inside of the door 7 so as to engage and seal with the membranes adjacent to the side support walls 15 when the door 7 was in place.

Figure 2:
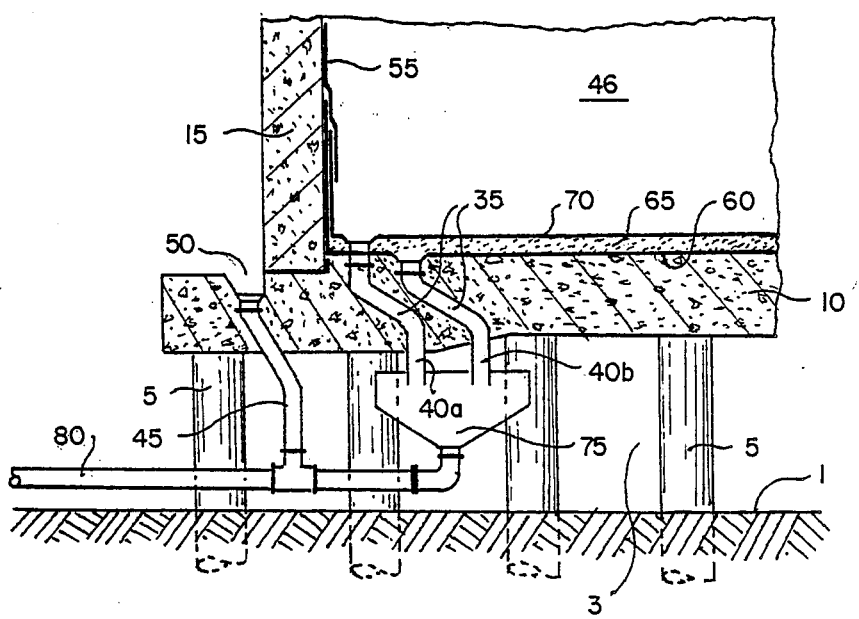
FIG. 2 is a sectional view of a lower portion of the facility showing a first embodiment to the drainage system.

A portion of the base 10 and side support walls 15 are shown in FIG. 2. The base 10 is again mounted on piles 5, creating space 3 thereunder. Base 10 has holes 35 extending therethrough, which preferably have inner drainage pipes 40a and 40b inserted therein. A base gutter 50 is utilized around the exterior of side support walls 15 to collect liquid drainage from the exterior of the building. Base gutter drain 45 conveys the runoff liquid from base gutter 50 to exterior drainage pipe 80. Inner drainage pipes 40a and 40b also empty into exterior drainage pipe 80. A valve (not shown) may be provided on drainage pipe 80 to shut off any liquid flow out of the facility. An inner drainage sump pump 75 is preferably utilized to move liquid from the interior of the facility through inner drainage pipes 40a and 40b to exterior drainage pipe 80.

The inner sealing means of the facility is also displayed in FIG. 2. A wall sealing layer 55 extends along the inner surface of side support wall 15. A base membrane 60 extends along the inside surface of the base 10, and also extends upwardly along side support wall 15 for a short distance to form a seal along the mating edge of side support wall 15 and base 10. A pervious layer 65, preferably constructed of sand, is laid on top of base membrane 60. An inner membrane 70 is laid on top of the pervious layer 65. Liquid collected within interior chamber 46 runs along inner membrane 70 and is removed through inner drainage pipe 40a. Pervious layer 65 acts as a transport mechanism for any liquid which penetrates either the base membrane 60 from the outside or the inner membrane 70 from the inside, and draws such liquid to the entrance of inner drainage pipe 40b, through which the liquid is passed to exterior drainage pipe 80.

Figure 3:
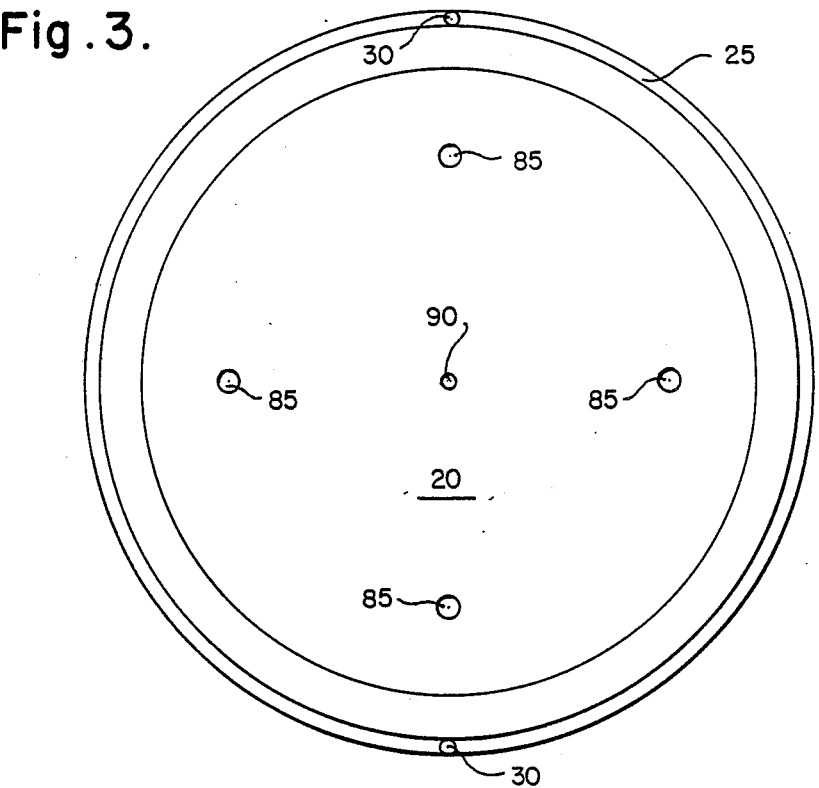
FIG. 3 is a top plan view of the facility.

In FIG. 3, the roof 20 of the facility is shown in more detail. Fill hatches 85 are provided for the loading and unloading of waste into the facility. The fill hatches may be of any standard configuration. Additionally, the facility may be loaded with waste prior to the placement of the roof 20. A vent 90 may also be provided which allows for the monitoring and removal of gasses which may collect inside the interior chamber. The vent 90 may be adapted to engage a gas collection and treatment system (not shown) should the gas be considered hazardous in itself. Such a collection and treatment system is well known in the art. Roof gutter 25 is shown, having two roof conductors 30 for emptying the liquid which collects in the roof gutters.

Figure 4:
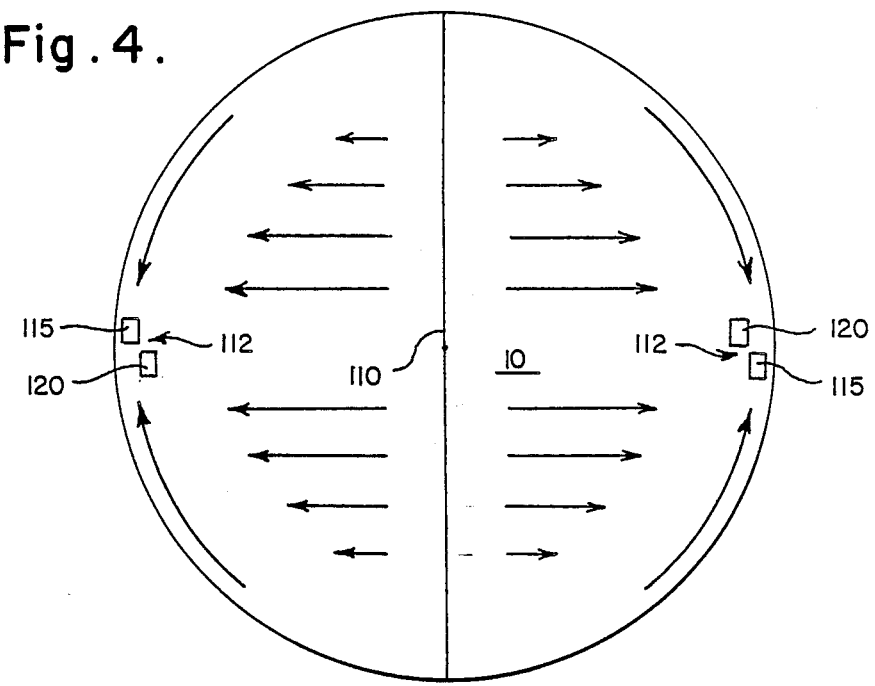
FIG. 4 is a top plan view of the base of the facility.

The base 10 of the facility is shown in more detail in FIG. 4. As shown in FIG. 4, the base 10 has a central raised centerline 110 from which the base 10 slopes downwardly to low points. Two base sumps 1? 2 are preferably utilized, being primary base sump 115 and secondary base sump 120. Arrows on FIG. 4 show the directional flow of liquid on the canted base 10.

Figure 5:
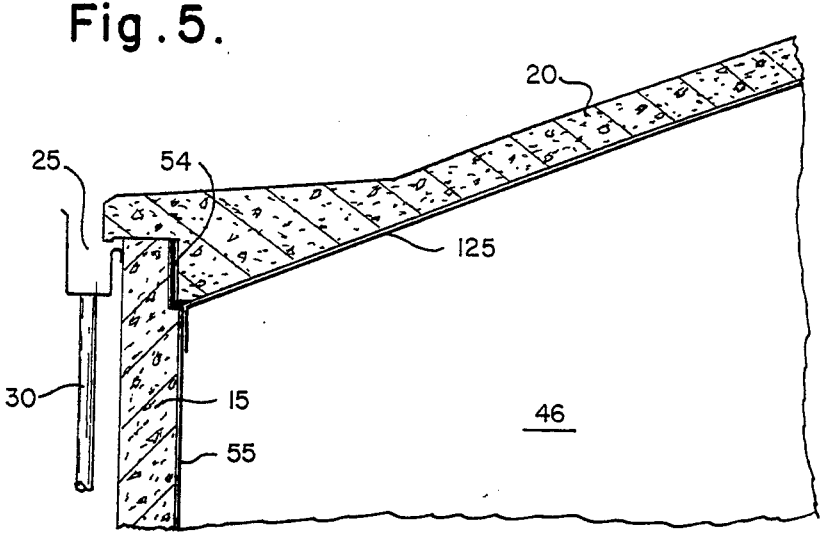
FIG. 5 is a sectional view of an upper portion of the facility.

FIG. 5 shows the joinder of roof 20 and side support walls 15 in more detail. Side support walls 15 extend upwardly to engage and support roof 20. Roof elastomer bearing pad 54 provides an engagement surface so that relative movement is possible between the roof 20 and side support walls 15 during changing weather conditions. A similar base elastomer bearing pad 56 shown in FIG. 6 is utilized to seat the side support wall 15 on the base.

Gutter 25 is mounted on the periphery of the roof 20, or at the top of side support walls 15. Gutter 25 is mounted such that liquid running off the roof 20 is collected and transported to roof gutter drain 30 which ultimately transports the liquid to the main drainage system.

Wall seal membrane 55 extends to roof 20 along the entire inside surface of side support walls 15. Wall seal membrane 55 forms a seal with roof inner liner 125 at the joinder of side support walls 15 and roof 20. Roof inner liner 125 is preferably constructed of epoxy, urethane or some similar sealant coating.

Figure 6:
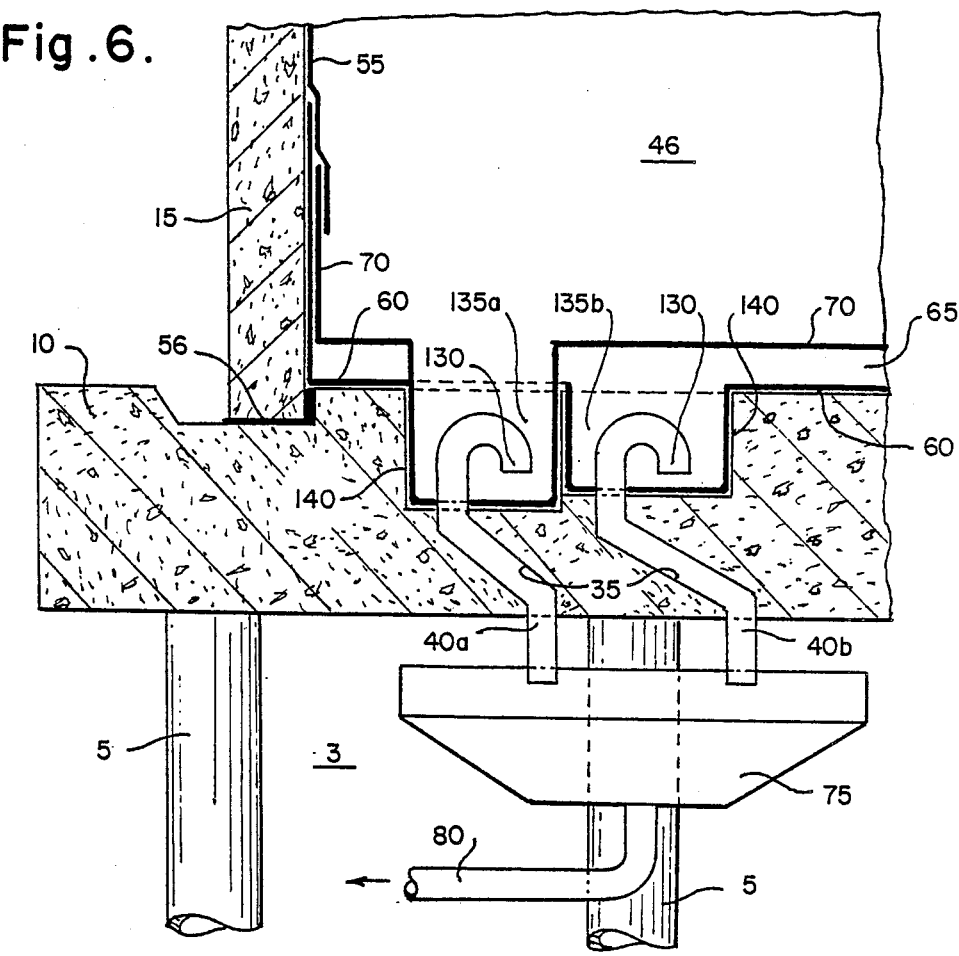
FIG. 6 is a sectional view, partially in elevation, of a portion of a second embodiment of the drainage system.

A second embodiment of the base drainage system is displayed in FIG. 6. A number of base cavities 140 are provided for the inner terminations of inner drainage pipes 40a and 40b. Each inner drainage pipe ends in a siphon end 130 which is an inverted U-shaped member. Liquid leachate 135a which is collected from the interior chamber 46, and liquid leachate 135b, collected from the pervious layer 65, deposit in the base cavities 140 and are removed through inner drainage pipes 40a and 40b, respectively, utilizing a siphoning technique well known in the art. The membranes which separate the base 10, the pervious layer 65 and the interior chamber 46 are adapted to also seal the respective base cavities 140 therein.

Inner drainage pipes 40a and 40b extend downwardly through holes 35 in base 10 to the space 3 below the base 10. Outer drainage sumps 75 are affixed to the exterior ends of inner drainage pipes 40a and 40b to assist in removing the liquid leachate 135 from inside the facility. The outer drainage sumps 75 pass the liquid on to the exterior drainage pipe 80.

While I have described a present preferred embodiment of the invention, it is to be distinctly understood that the invention is not limited thereto but may be otherwise embodied and practiced within the scope of the following claims.

We claim:

1. A facility for the storage and containment of material, comprising:
    a base having an upper surface, a lower surface and a plurality of holes extending therebetween;
    side support means, mounted on the upper surface of the base;
    roof means, mounted on the side support means, adapted to form a chamber in conjunction with the side support means and the base;
    sealing means, mounted within the chamber, adapted to partition the chamber from the exterior environment, the sealing means having
        at least one membrane layer, and at least one pervious layer adapted to be applied adjacent to at least a portion of the membrane layer,
    base support means, for mounting in the earth surface, to support the facility a preselected spaced distance from the earth surface;
    drainage means, mounted adjacent to the lower surface of the base and adapted to engage at least one of the holes in the base, the drainage means mounted within the spaced distance created between the facility and the earth surface;
    wherein a space is created between the facility and the earth surface sufficient, for visual inspection of the lower surface of the base and the drainage means.

2. A facility as described in claim 1 wherein the facility is mounted above the surface of the earth.

3. A facility as described in claim 1 wherein the roof means is dome-shaped.

4. A facility as described in claim 1 wherein the roof means further comprises a perimeter having a roof gutter mounted thereon, the gutter adapted to drain water from the roof means to a roof drain point.

5. A facility as described in claim 4, wherein the roof gutter is adapted to drain into the drainage means.

6. A facility as described in claim 5, wherein the roof gutter further comprises a drain conductor to move liquid from the roof gutter to the drainage means.

7. A facility as described in claim 1 wherein the roof means further comprises an inner surface which is dome shaped and forms the upper surface of the chamber, the dome shaped interior surface adapted to facilitate collection of condensed liquids within the chamber.

8. A facility as described in claim 7, wherein the inner surface of the roof means further comprises a sealant coating.

9. A facility as described in claim 1 wherein the base support means are piles.

10. A facility as described in claim 1 wherein the upper surface of the base forms the lower surface of the chamber, the upper surface of the base being canted to facilitate runoff of liquids from the base to at least one low point.

11. A facility as described in claim 10, further comprising a sump located at a low point of the base.

12. A facility as described in claim 10, wherein the canted upper base surface further comprises a raised point and is canted away from the raised point.

13. A facility as described in claim 10, wherein the canted upper base surface further comprises a raised center line and is canted away from the raised line.

14. A facility as described in claim 1, wherein the base extends beyond the side support means and further comprises a base gutter therein for the transport of liquid runoff to a base drain point.

15. A facility as described in claim 14, wherein the base gutter drains into the drainage means.

16. A facility as described in claim 1, further comprising interior drainage means mounted within the holes extending through the base.

17. A facility as described in claim 16, wherein the base further comprises depressions located at the inner terminations of the holes extending therethrough, and the interior drainage means have an inner end and an outer end, the inner end further comprising a siphon mounted within the depressions, adapted to drain out a liquid which collects in the depressions.

18. A facility as described in claim 16, wherein the interior drainage means extend into the holes in the base from a point completely interior to the sealing means.

19. A facility as described in claim 16, wherein the interior drainage means extend into the holes in the base from a point within the pervious layer of the sealing means.

20. A facility as described in claim 1, wherein the drainage means further comprises a sump to move liquid matter from one of the chamber and sealing means to the drainage means.

21. A facility as described in claim 1, wherein the roof means further comprises at least one fill hatch for the loading of material into the chamber.

22. A facility as described in claim 1, wherein the roof means further comprises at least one vent.

23. A facility as described in claim 1, wherein the base is constructed of concrete.

24. A facility as described in claim 1, wherein the base support means is further comprised of a plurality of members which are equally spaced from each other.

25. A facility as described in claim 1, wherein the base support means is further comprised of a plurality of members which each support an equal load.

26. A facility as described in claim 1, wherein the base support means is further comprised of a plurality of members which each support a share of the facility proportionate to the spacing therebetween.

27. A facility as described in claim 1, wherein the base support means is further comprised of a plurality of members which each support a share of the facility proportionate to the size thereof.

28. A facility as described in claim 1, wherein the side support means have a resealable door therein.

* * * * *

UNITED STATES PATENT AND TRADEMARK OFFICE
CERTIFICATE OF CORRECTION

PATENT NO. : 4,973,195

DATED : November 27, 1990

INVENTOR(S) : JOHN M. SWEENEY, WILLIAM P. LAFAYETTE, BRIAN MARSTELLAR

It is certified that error appears in the above-identified patent and that said Letters Patent is hereby corrected as shown below:

Column 4, line 61, change "1?2" to --112--.

Signed and Sealed this

Thirty-first Day of March, 1992

Attest:

HARRY F. MANBECK, JR.

Attesting Officer

Commissioner of Patents and Trademarks